United States Patent [19]
Yoon et al.

[11] Patent Number: 5,587,085
[45] Date of Patent: *Dec. 24, 1996

[54] METHOD FOR DEWATERING PARTICLES

[75] Inventors: Roe-Hoan Yoon; Gerald H. Luttrell, both of Blacksburg, Va.

[73] Assignee: Virginia Tech Intellectual Property Inc., Blacksburg, Va.

[ * ] Notice: The term of this patent shall not extend beyond the expiration date of Pat. No. 5,458,786.

[21] Appl. No.: 476,513

[22] Filed: Jun. 7, 1995

Related U.S. Application Data

[63] Continuation-in-part of Ser. No. 229,012, Apr. 18, 1994, Pat. No. 5,458,786.

[51] Int. Cl.[6] .................................................. C02F 1/54
[52] U.S. Cl. ....................... 210/711; 44/572; 44/626; 209/5; 210/712; 210/729; 210/770
[58] Field of Search .................... 44/562, 572, 620, 44/626; 209/5; 210/710–712, 729, 769, 770, 808; 23/313 R

[56] References Cited

U.S. PATENT DOCUMENTS

| | | | |
|---|---|---|---|
| 3,992,784 | 11/1976 | Verschuur et al. | 34/12 |
| 4,290,896 | 9/1981 | Gordon et al. | 210/710 |
| 4,290,897 | 9/1981 | Swihart | 210/710 |
| 4,484,928 | 11/1984 | Keller | 44/15 R |
| 4,552,077 | 11/1985 | Borio et al. | 110/347 |
| 4,670,159 | 6/1987 | Garrett et al. | 210/712 |
| 4,770,766 | 9/1988 | Keller et al. | 209/5 |
| 4,981,582 | 1/1991 | Yoon et al. | 209/164 |
| 5,087,269 | 2/1992 | Cha et al. | 49/626 |
| 5,167,798 | 12/1992 | Yoon et al. | 209/170 |
| 5,458,786 | 10/1995 | Yoon et al. | 210/711 |

*Primary Examiner*—Peter A. Hruskoci
*Attorney, Agent, or Firm*—Whitham, Curtis, Whitham & McGinn

[57] ABSTRACT

Fine particles are dewatered in an energy efficient process in which a non-polar liquid or a mixture of different hydrophobic liquids are used to displace the water from the particle surface. Thermodynamically, this process is spontaneous. The only energy required for this process is to recover the hydrophobic liquid(s) for recycling purposes. The hydrophobic liquids are recovered in gaseous form either by lowering the pressure or by heating, and converted back to liquid form for re-use. The most economical reagents that can be used for this purpose include propane, butane, pentane, and ethane. Carbon dioxide may also be used for the dewatering process described in the present invention. The process of dewatering by displacement is capable of achieving the same or better level of moisture reduction as thermal drying but at substantially lower energy costs.

5 Claims, 4 Drawing Sheets

DEWATERING BY DISPLACEMENT

THERMAL DRYING

METHOD FOR DEWATERING PARTICLES

CROSS REFERENCE TO RELATED APPLICATIONS

This application is a continuation-in-part of application Ser. No. 08/229,012, filed Apr. 18, 1994, now U.S. Pat. No. 5,458,786.

DESCRIPTION

Background of the Invention

1. Field of the Invention

The invention generally relates to processes and equipment for dewatering particles. More particularly, the invention contemplates a methodology wherein liquefied gas displaces attached water droplets in a spontaneous reaction with the particles being subsequently rendered dry by vaporizing the liquefied gas.

2. Background Description

Minerals such as coal, clays, phosphates, sulfides, and the like, and metals such as copper, tungsten, silver, and gold, are often mixed with water to form an aqueous slurry for various processing operations. For example, U.S. Pat. Nos. 4,981,582, 5,167,798, and 5,397,001 to Yoon et al. describe microbubble floatation technology used to separate fine particles of minerals or coal from non-valuable materials. Also, waste materials are often disposed of with water in various sewage handling operations.

While water provides a convenient medium for performing a wide variety of operations, such as cleaning, material transport, reaction chemistry, etc., problems arise when the ultimate product desired is dried particulate material. When water clings to the surfaces of valuable materials such as coal, clays, minerals, metals, etc., it adds non-useful weight to the material. This weight increases the cost of transporting the material by truck or train. In addition, the water may affect the performance of the material. For example, coal burns less efficiently.

The problem of surface water clinging to particulates is most severe in smaller particles, such as particles of less than 0.2 inches or 0.5 mm in diameter. This is due to the smaller particles having much higher surface-to-volume ratios.

A wide variety of technologies have been developed to dry particulate matter.

One method simply involves removing water by heating the material. Thermal heating requires a significant amount of energy input. The energy must be sufficient to overcome the attraction between the water molecules with each other and the particulate material, thereby vaporizing the water and leaving a dry material. As a practical matter, the cost of the energy required to thermally dry the particulate material may be more expensive than the value of the particulate material to be salvaged. In addition, the thermal drying technique would be ineffective for particulate materials which liquify or undergo a phase change below the temperature required for water removal, and the thermal drying technique poses environmental problems due to the requirement of large amounts of air input and steam effluent.

Another method involves mechanically removing water by vacuum filtration, pressure filtration, hyperbaric filtration, centrifugation, etc. While these techniques do not expose the particulate matter to heat, they still require a large amount of energy input. Under these methods, energy is required to overcome the force of attraction of the water molecule to the particulate matter. Current mechanical dewatering techniques have not proven satisfactory in achieving a suitable dryness in coal and minerals processing operations. In addition, these techniques are time consuming, and often involve tedious steps such as the separation of caked particulates.

Currently, small particles of phosphates, coal, and other minerals and metals, are often discarded due to difficulties in cleaning and drying the particles. This practice is tremendously wasteful and has an adverse impact on the environment. What is needed is an environmentally safe, effective, and inexpensive method for dewatering particles, that will allow the recovery and use of material which would otherwise be discarded.

SUMMARY OF THE INVENTION

It is an object of this invention to provide an inexpensive, less energy intensive means of dewatering fine particles.

According to the invention, water is removed from particulate surfaces at low cost and with high effectiveness. A slurry of hydrophobic particles and water is pumped into a mixing chamber along with a gas that can be converted into a non-polar, hydrophobic liquid. The pressure within the chamber is maintained sufficiently high enough to condense the gas into its liquid form. The hydrophobic liquid formed as a result of the condensation displaces the water from the surface of the particles because it has a higher affinity for the hydrophobic particle surface than does the water for the particle surface. When a sufficient amount of the hydrophobic liquid is used, each particle is completely encapsulated by a film of the hydrophobic liquid without leaving water in between. The mixture of particles, water, and non-polar liquid is then passed into another chamber in which the particles and hydrophobic liquid are phase-separated from the displaced water. The hydrophobic liquid can be recovered from the particles by lowering the pressure to atmospheric conditions to convert it to a gaseous form. Heating the liquid could also be used as a means to gasify the hydrophobic liquid. The gas then can be recycled.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
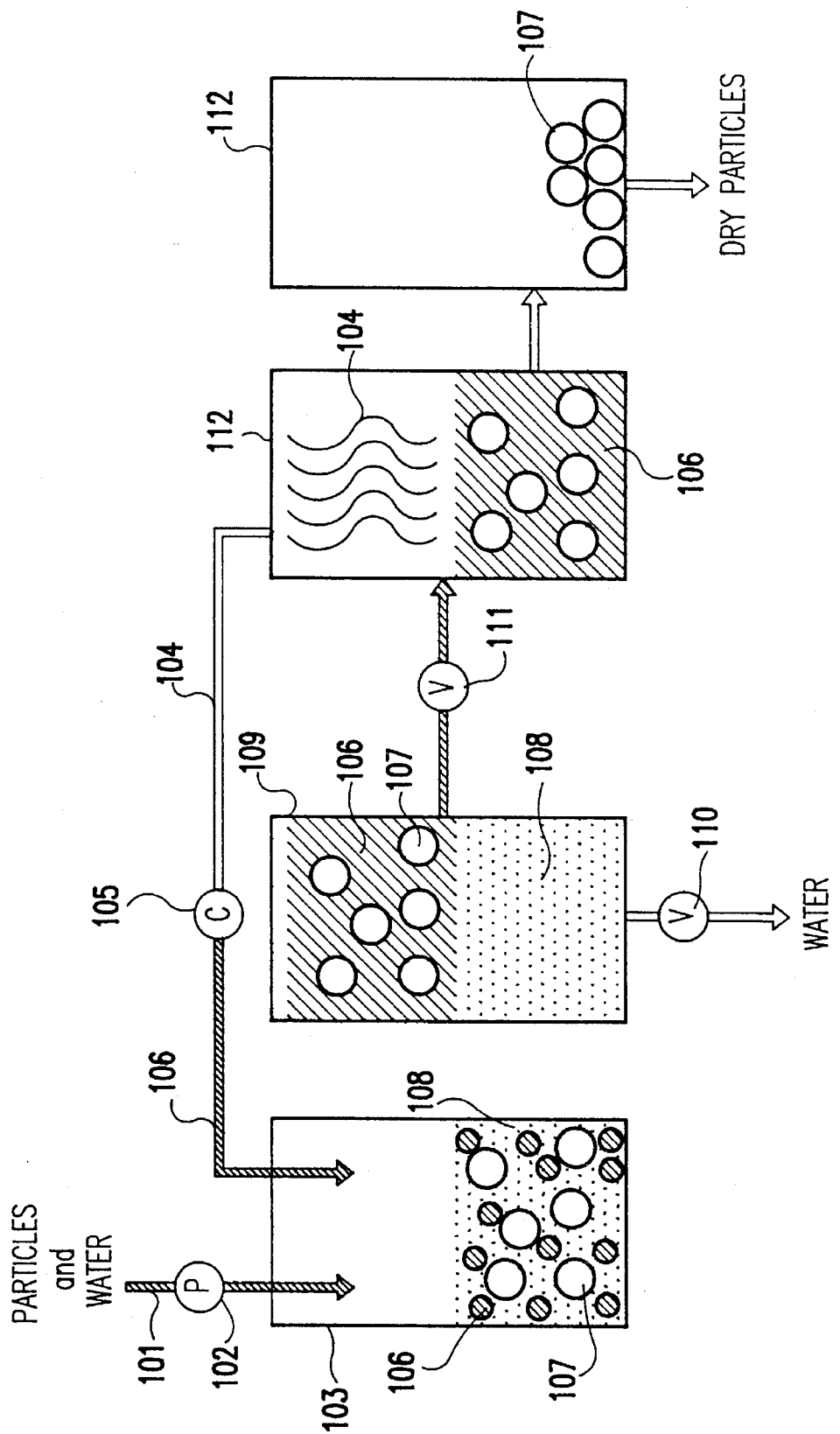
FIG. 1 is a schematic diagram showing equipment used to dewater particles.

Referring now to the drawings, and more particularly to FIG. 1, an aqueous particle slurry 101 is directed by a suitable means such as pump 102 into a mixing chamber 103, in which a non-polar liquefied gas 106 is also introduced. The aqueous particle slurry 101 can have a moisture content ranging from 10% water to 99.9% water, and the invention is quite useful with slurries of high solids content ranging from 10% to 60% water.

The chamber 103 is pressurized to maintain the non-polar hydrophobic compound 106 in liquid state. Inside the chamber 103, the hydrophobic liquid 106 displaces the water 108 from the surface of particles 107 and spreads over the surface of the particles 107 to form a film. In one embodiment of this invention, the particles 107 must be hydrophobic in character, such as bituminous or anthracite coals, since the interaction of and attraction between the hydrophobic liquid 106 and the particles 107 must be stronger than the attraction between the water 108 and particles 107.

The mixture of the particles 107, water 108 and hydrophobic liquid 106 is then moved to another chamber 109, where the hydrophobic liquid 6 containing particles 107 are phase-separated from water 108 by allowing a quiescent condition. The water 108 is discarded through valve 110 in chamber 109, to leave a mixture of particles 107 and hydrophobic liquid 106.

If desired, the mixture of particles 107 and hydrophobic liquid 106, can be transferred to a third chamber 112 through valve 111 for recovery of the hydrophobic liquid. However, chamber 109 could be modified such that the water 108 is separated and then the hydrophobic liquid 106 is separated in batch fashion. In order to recover the hydrophobic liquid 106, pressure is reduced to atmospheric conditions. The pressure reduction causes the hydrophobic liquid 106 to vaporize and form a gas 104. The gas 104 is subsequently compressed to re-form the hydrophobic liquid 106 at compressor 105. In this way, minimal loss of the hydrophobic liquefied gas 106 can be achieved, and recycling of the hydrophobic liquefied gas 106 reduces the overall cost of the dewatering process. After removal of the gas 104, the dry particles can be retrieved from chamber 112.

The dewatering process thus described can achieve dryness levels of 20% moisture and below from feedstock containing greater than 40–99% moisture. Tests with fine coal dewatering have demonstrated that moisture contents as low as 0.1–5% can be achieved. Similar results (e.g. dryness to 0.1 to 5% water) can be achieved with other particles including clays, phosphates, metals, etc.

Figure 2:
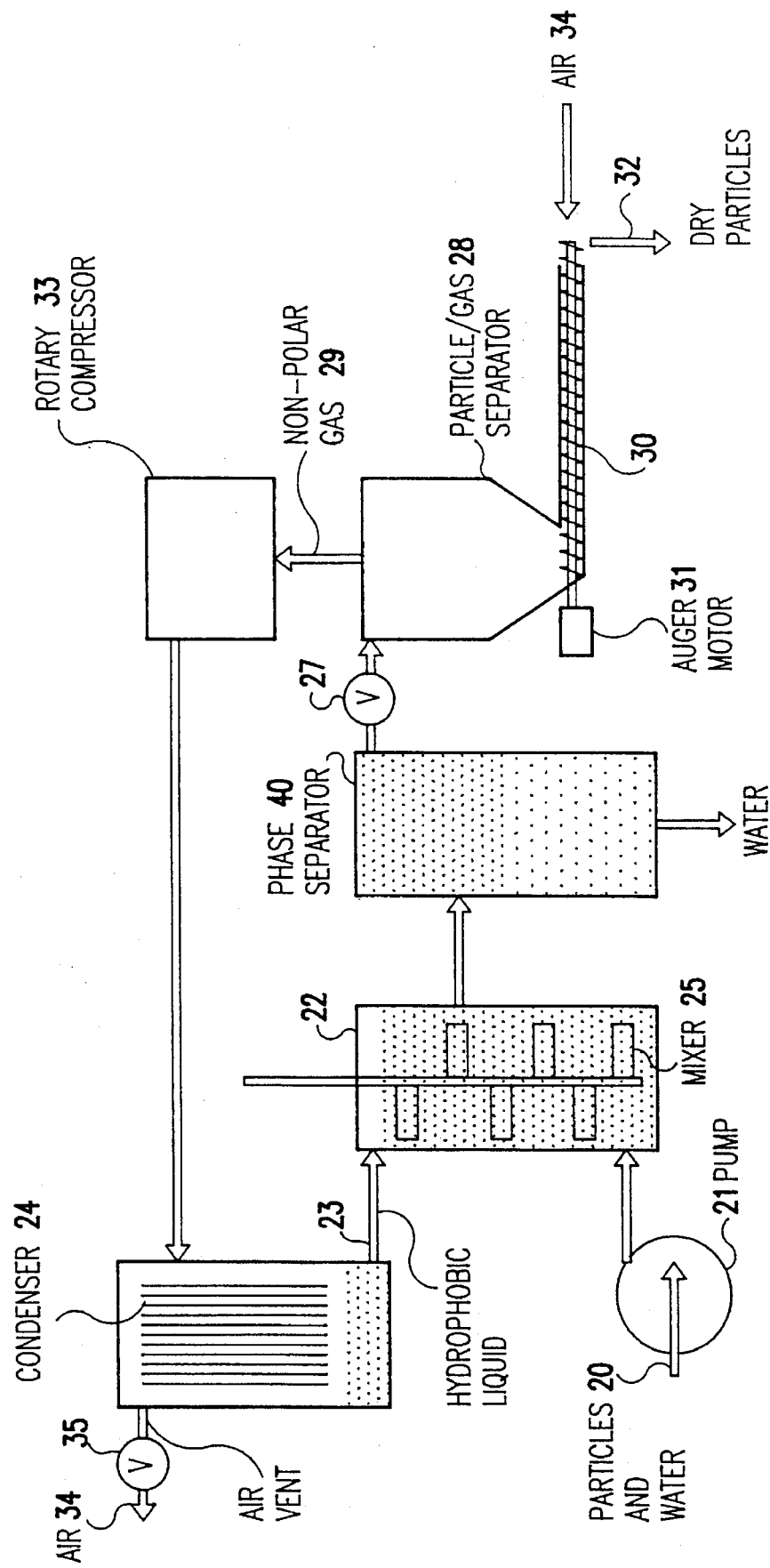
FIG. 2 is a schematic diagram showing equipment used to dewater particles.

FIG. 2 shows a detailed schematic for the process presented in FIG. 1. An aqueous slurry of particles and water (e.g., coals, clays, phosphates, etc.) is directed by a pump 21 into a mixing chamber 22 along with a non-polar, hydrophobic liquid sent from condenser 14 into the mixing chamber 22. The mixing chamber 20 is kept at a pressure sufficient to maintain the hydrophobic liquid in its liquid form. An agitator or stirring paddle 25 creates turbulence inside the mixing chamber 22 so that there is good contact between the particles and the droplets of the hydrophobic liquid. Upon contact between the particle and hydrophobic liquid droplet, the latter displaces water from the particle surface.

The mixture of particles, water and hydrophobic liquid is then transferred to a phase separator 40, where the water is separated from the hydrophobic liquid phase containing fine particles. The amount of the hydrophobic liquid is controlled so that the phase-separation can be achieved without entraining water.

The phase-separated hydrophobic liquid containing particles is removed via a valve 27 to a particle/gas separator 28, where the pressure is reduced or the temperature is raised so that the non-polar liquid is recovered in gaseous form. An auger 30 driven by a motor 31 transports the dry particulate product 32 to storage, end use, or further processing stages, while the non-polar gas 29 is recycled for reuse. The non-polar gas containing some entrained air 34 which enters by way of the auger 30 is compressed using a rotary compressor 33 in order to transform the non-polar gas into liquid. Before venting the entrained air into the atmosphere, the mixture of the non-polar liquid and air is sent to a condenser 24, so that the vapor pressure of the non-polar liquid is reduced, thereby minimizing the loss of the non-polar liquid. Air vent 35 allows the air to escape the condenser 24 after condensation has occurred.

Figure 3:
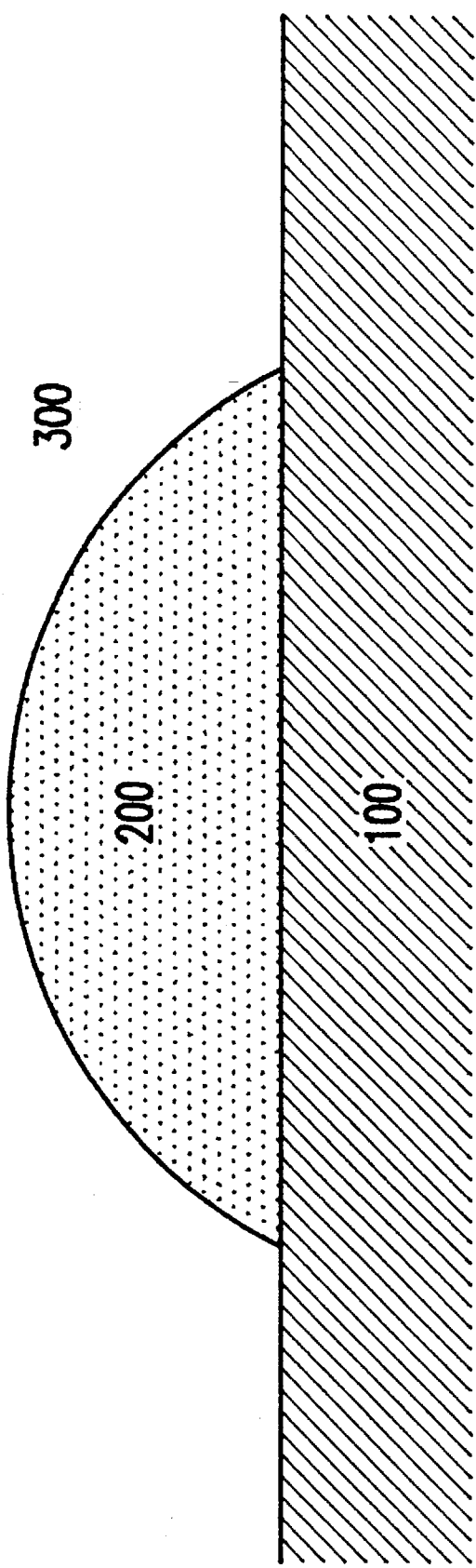
FIG. 3 is a diagram showing the interface of the hydrophobic particle, hydrophobic liquid, and water at the surface of the particle.

FIG. 3 shows a drop of hydrophobic liquid 200 positioned on a hydrophobic particle surface 100 immersed in water 300. When the hydrophobic liquid 200 displaces the water 300 from the surface 100, the contact area between the particle and the hydrophobic liquid 200 will increase at the expense of the contact area between the particle surface 100 and water 300. In order for the displacement to occur spontaneously, the free energy associated with it ($\Delta G_{dis}$) should be negative as follows:

$$\Delta G_{dis} = (\gamma_{12} + \gamma_{23} - \gamma_{13}) dA \qquad (1)$$

in which $\gamma_{12}$ is the interfacial tension between the particle surface 100 and the hydrophobic liquid 200, $\gamma_{23}$ the same between the hydrophobic liquid 200 and water 300, $\gamma_{13}$ the same between the particle surface 100 and water 300, and dA is the change in the contact area between the particle surface and the hydrophobic liquid.

By dividing Eq.1 with dA, one can obtain the following relationship:

$$(dG_{dis}/dA) = \gamma_{12} + \gamma_{23} - \gamma_{13} < 0 \qquad (2)$$

in which $dG_{dis}/dA$ is the free energy of displacement per unit area. One can substitute the following relationships:

$$\gamma_{12} = \gamma_1 + \gamma_2 - 2\sqrt{\gamma_1^\delta \gamma_2^\delta} - 2\sqrt{\gamma_1^P \gamma_2^P} \qquad (3)$$

$$\gamma_{23} = \gamma_2 + \gamma_3 - 2\sqrt{\gamma_2^\delta \gamma_3^\delta} - 2\sqrt{\gamma_2^P \delta_3^P} \qquad (4)$$

$$\gamma_{13} = \gamma_1 + \gamma_3 - 2\sqrt{\gamma_1^\delta \gamma_3^\delta} - 2\sqrt{\gamma_1^P \gamma_3^P} \qquad (5)$$

which are generally known as Fowkes equation, and where $\gamma_1$ is the surface tension of the particle, $\gamma_2$ is the surface tension of the hydrophobic liquid, $\gamma_3$ is the surface tension of water, the superscript d refers to the dispersion component of the respective surface tension, and the superscript p refers to its polar component.

$$\frac{\delta G dis}{\delta A} = 2\gamma_2 - 2(\sqrt{\gamma_1^\delta \gamma_2^\delta} + \sqrt{\gamma_1^P \gamma_2^P} + \sqrt{\gamma_2^\delta \gamma_3^\delta} + \sqrt{\gamma_2^P \gamma_3^P} - \sqrt{\gamma_1^\delta \gamma_3^\delta} - \sqrt{\gamma_1^P \gamma_3^P}) < 0 \qquad (6)$$

Eq. [2] then becomes: from which one can obtain the following relationship:

$$2\gamma_2 < (2\sqrt{\gamma_1^\delta \gamma_2^\delta} + 2\sqrt{\gamma_1^P \gamma_2^P}) + (2\sqrt{\gamma_2^\delta \gamma_3^\delta} + 2\sqrt{\gamma_2^P \gamma_3^P}) - (2\sqrt{\gamma_1^\delta \gamma_3^\delta} - 2\sqrt{\gamma_1^P \gamma_3^P}) \qquad (7)$$

which represents a thermodynamic criterion for the dewatering process as described in the first embodiment of the invention.

The term $2\gamma_2$ is the work of cohesion of the hydrocarbon liquid, while the first, second and the third terms on the right-hand side of the inequality represent the work of adhesions between particle and oil, oil and water, and particle and water, respectively. Therefore, Eq. 7 can be explained qualitatively as follows:

$$\text{WORK OF COHESION} < \text{WORK OF ADHESION OF 2 ON 1} + \text{WORK OF ADHESION OF 2 ON 3} - \text{WORK OF ADHESION OF 3 on 1} \quad (8)$$

which states that for the hydrophobic liquid to displace the water from the particle surface, the work of cohesion of the liquid should be smaller than the sum of the work of adhesion of the liquid on the particle and the work of adhesion of the liquid on water minus the work of adhesion water on the particle. Usually, the work of adhesion of a hydrophobic liquid on water is significantly smaller than that between a hydrophobic particle, such as coal, and the hydrophobic liquid. Therefore, the thermodynamic criterion for dewatering by displacement dictates that the interaction energy between the hydrophobic liquid and particle should exceed that between the particle and water, and that the difference between the two be larger than the work of cohesion of the hydrophobic liquid.

Based on the thermodynamic reasoning discussed above, the non-polar liquids that can be used for the dewatering process as described in the present invention should have as high affinity as possible for the particle to be dewatered, while the particle should be as hydrophobic as possible. The dewatering process based on displacement will work extremely well with hydrophobic coals such as the bituminous and anthracite coals mined in eastern U.S. The liquid is driven by the hydrophobic forces, which was first measured and reported in scientific literature in 1984 by Israelachivili and Pashley.

Another important criterion for the hydrophobic liquid is that its work of cohesion be as low as possible. At the same time, the non-polar liquids employed within the practice of this invention should have high enough vapor pressure so that they are in gaseous form at room temperature, but can readily be converted to liquid form through application of pressure.

Suitable non-polar liquids that meet these criteria include the normal paraffinic hydrocarbons (such as ethane, propane, butane and isobutane) and carbon dioxide (although carbon dioxide does not float on water). The most ideal non-polar liquid that can be used for dewatering may be butane which can be liquefied at a pressure between 25–35 psi above atmosphere at room temperature. Mixtures of non-polar liquids (e.g., 5–95% butane and 5–95% propane) can also be used and may provide benefits in terms of cost and safety of operation.

EXAMPLE 1

The process of the present invention will be further illustrated by the following example. A 400 mesh bituminous coal from Pittsburgh No. 8 seam was dispersed in tap water to prepare a 5% by weight of coal slurry. The coal sample had been stored in a freezer to keep it from loosing its surface hydrophobicity due to superficial oxidation. Approximately 75 ml of the slurry was placed in a copper tubing with two valves on each end. With the tubing standing vertically, a stream of butane gas was injected through the valve at the bottom until the pressure was high enough to convert the gaseous butane into its liquid form. After closing the valve at the bottom, the mixture of coal, water and liquid butane was agitated for a few minutes by shaking the tubing vigorously by hand. The copper tubing was then let to stand vertically to allow phase-separation. The water was slowly removed from the tubing by opening the valve at the bottom. The valve was closed when the mixture of coal and butane began to come out of the tubing. At this point, what was left in the tubing was a mixture of mostly coal and butane in liquid form. The butane was removed from the coal by opening the valve at the top so that it can exit the copper tubing as gas. The coal was removed from the copper tubing and analyzed for moisture. The product coal assayed 3.6% moisture.

As such, the process is capable of dewatering fine particles such as coal containing a wide range of moisture (10–98% by weight). The moisture content of the product is comparable to those by thermal drying (e.g., less than 20% by weight), but requires significantly less energy. Very dry coal of less than 5% moisture is easily achieved.

Figure 4B:
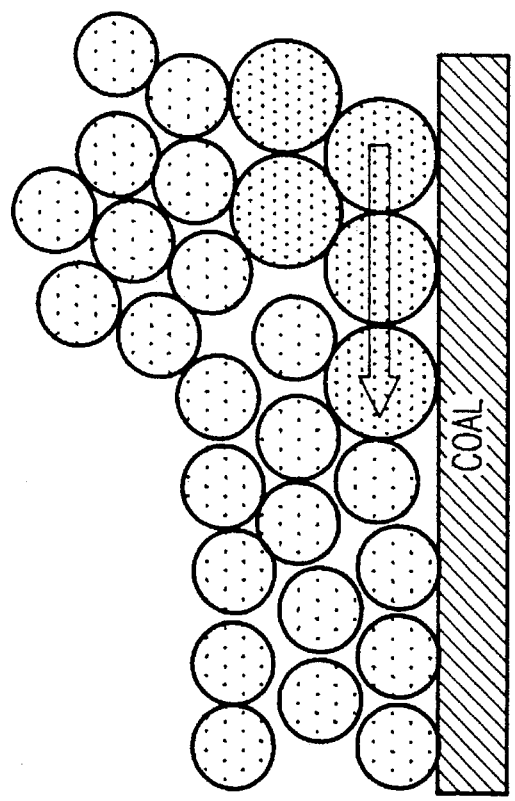
FIGS. 4a and 4b are drawings of the surface of a hydrophobic particle illustrating evaporation and displacement, respectively.
Figure 4A:
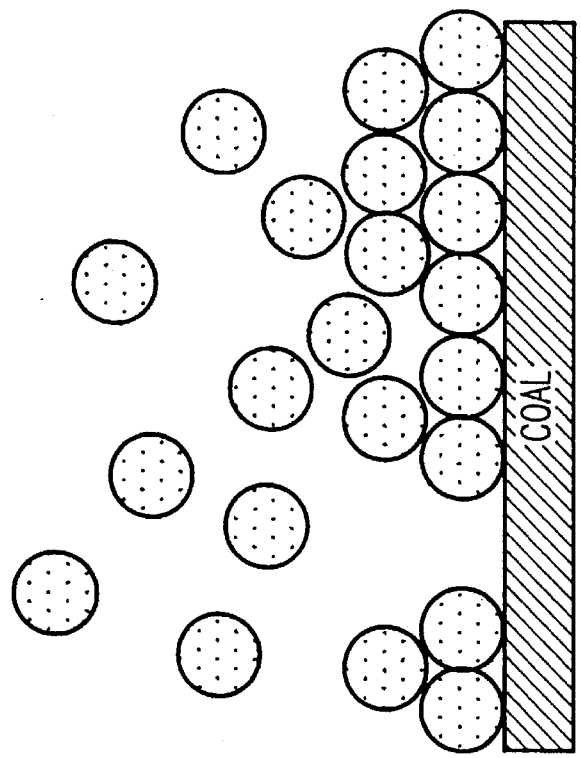

FIGS. 4a and 4b illustrate the reason why the dewatering process described should be cheaper than the thermal drying. In the latter, large amounts of heat exceeding the latent heat of evaporation is required to remove all the water molecules which are deposited in multilayers. On the other hand, the dewatering process based on displacement as described in the present embodiment invention requires only the energy necessary to displace the water molecules in the first monolayer. The only significant energy consumption in the present invention would be to recycle the hydrophobic liquid, which is minimal as compared to thermal drying.

The displacement of water by an easily recoverable, non-polar liquid will provide substantial savings in energy costs since water will not need to be evaporated. Since the process can handle particle slurries having a wide range of solids contents, no other dewatering step is required to obtain suitable feed. Dust and explosion hazards are also reduced since no heating is involved. The process is capable of treating even the finest particle sizes with little difficulty (e.g., micron to millimeter dimensions, 1 μm to 400 mm).

While the invention has been described in terms of its preferred embodiments, those skilled in the art will recognize that the invention can be practiced with modification within the spirit and scope of the appended claims. the appended claims.

We claim:

1. A method for dewatering hydrophobic particles, comprising the steps of:

adding to a mixture comprised of water and hydrophobic particles, a quantity of at least one hydrophobic compound which is in a gaseous state under atmospheric pressure and in liquid state at higher pressures, said hydrophobic compound being under pressure and in said liquid state during said adding step, said quantity of said hydrophobic compound being sufficient to displace water from surfaces of said hydrophobic particles;

spontaneously displacing water from said surfaces of said hydrophobic particles while said hydrophobic compound is in its liquid state;

separating said hydrophobic compound and said hydrophobic particles from said water by the substeps of:
    floating said hydrophobic compound and said hydrophobic particles on top of said water, and
    recovering a binary composition of said hydrophobic compound and said hydrophobic particles from said mixture;

reducing said pressure of said binary composition to cause said hydrophobic compound to change to said gaseous state and separate from said hydrophobic particles;

collecting dried hydrophobic particles after said step of reducing pressure; and recycling said hydrophobic compound for use in said adding a step.

2. The method of claim 1 wherein said hydrophobic compound is selected from the group consisting of ethane, propane/and butane.

3. The method of claim 1 wherein said hydrophobic compound is butane.

4. The method of claim 1 wherein said step of reducing pressure causes said hydrophobic compound to intermix with air, and wherein said step of recycling includes the steps of:

pressurizing said hydrophobic compound to cause said hydrophobic compound to change said liquid state;

condensing said hydrophobic compound; and separating said air intermixed with said hydrophobic compound after condensing during said recycling step.

5. The method of claim 1, wherein said hydrophobic particles have a particle size from 1 µm to 400 mm.

* * * * *